United States Patent [19]

Kanayama et al.

[11] Patent Number: 4,550,635
[45] Date of Patent: Nov. 5, 1985

[54] PIPE END CUTTING APPARATUS

[75] Inventors: Kiyoshi Kanayama, Ebina; Shoji Asano, Atsugi, both of Japan

[73] Assignees: Nippon Kokan Kabushiki Kaisha, Tokyo; Nippon Kokan Koji Kabushiki Kaisha, Yokohama, both of Japan

[21] Appl. No.: 509,444
[22] PCT Filed: Oct. 15, 1982
[86] PCT No.: PCT/JP82/00408
§ 371 Date: Jun. 14, 1983
§ 102(e) Date: Jun. 14, 1983

[30] Foreign Application Priority Data

Oct. 16, 1981 [JP] Japan .............................. 56-152804

[51] Int. Cl.⁴ ................................................ B23B 5/16
[52] U.S. Cl. ........................................ 82/4 C; 82/4 R
[58] Field of Search .................. 82/4 R, 4 C; 144/205

[56] References Cited

U.S. PATENT DOCUMENTS

| | | | |
|---|---|---|---|
| 3,141,365 | 7/1964 | Peters . | |
| 3,234,826 | 2/1966 | Gill | 82/4 R |
| 3,733,939 | 5/1973 | Paysinger et al. | 82/4 C |
| 4,126,065 | 11/1978 | Clavin | 82/4 C |
| 4,314,491 | 2/1982 | Hartmann et al. | 82/4 C |

FOREIGN PATENT DOCUMENTS 52-155486 12/1977 Japan .
810331 11/1976 U.S.S.R. .

Primary Examiner—Leonidas Vlachos
Assistant Examiner—Jerry Kearns
Attorney, Agent, or Firm—Fleit, Jacobson, Cohn & Price

[57] ABSTRACT

A pipe end cutting apparatus for processing pipes without variations in the angle of bevel and the root face thickness due to changes in the diameter of the pipes. There are provided a pipe clamping device for clamping the inside of a pipe, a rotary driving unit supported on the pipe clamping device, a feed unit for moving the rotary driving unit in the axial direction, and a control unit for controlling the rotary driving unit to rotate concentrically with the pipe. Processing tools for cutting the pipe end are mounted on the rotary driving unit through parallelogram links in such a manner that the processing tools are each caused to make a parallel movement in the radial direction of the pipe, while maintaining its cutting angle at a given angle with respect to the pipe end. When a pipe of any other type having a different diameter is to be beveled, processing tool holders can be moved in the radial direction of the pipe so that the processing tools make a parallel movement, and the cutting edges of the processing tools also make a parallel movement thus maintaining the angle of the cutting edges unchanged with respect to the axis of pipes to be beveled. The ends of pipes are processed to provide the predetermined angle of bevel and root face thickness unless the position of the rotary driving unit in the pipe axial direction is changed.

3 Claims, 10 Drawing Figures

PIPE END CUTTING APPARATUS

TECHNICAL FIELD

The present invention relates to a pipe end cutting apparatus having no danger of causing variations in the angle of bevel and the root face thickness due to different diameters of pipes to be beveled, and more particularly to a pipe end cutting apparatus suitable for beveling pipes at a job site.

BACKGROUND TECHNIQUES

In the past, there has been a pipe end cutting apparatus disclosed in Japanese Utility Model Publication No. 51-45592. As shown in FIGS. 1 and 2, this pipe end cutting apparatus includes an inner pipe clamping device (102) for holding the end of a pipe (101), a rotary member (104) having a face plate (103) adapted for rotation in a place facing the end of the pipe (101) and mounted on the inner pipe clamping device (102), a plurality of arms (107) each having one end pivotably connected to the rotary member (104) and having the other end formed into a free end and provided with a processing tool (105) and a roller (106) such that the engagement of the processing tools (105) with the end of the pipe (101) also brings the rollers (106) into engagement with the pipe inner surface, and a plurality of elastic members (108) each being adapted to urge the free end of each arm (107) outwardly in the radial direction whereby, as shown in FIG. 3, when the end of the pipe having a radius R is cut by each processing tool (105), provided on the free end of each arm (107), pivotably mounted on a pivot pin (109) of the face plate and having a radius L, the processing tool (105) is positioned at a point A and the angle of inclination between the cutting face of the processing tool (105) and the normal $n_1-n_1$ of the pipe is reduced to zero, whereas when the end of a pipe having a radius (R+d) is cut the processing tool (105) is positioned at a point B, and the angle of inclination between the cutting face of the processing tool (105) and the normal $n_1-n_1$ of the pipe becomes $\alpha°$.

Now assuming that with a plate having a thickness T, $\theta_1$ represents the cutting angle when the angle of inclination between the cutting face of the processing tool and the normal n—n of the plate is 0° and $\theta_2$ and $t_2$ represent, respectively, the angle of inclination and the thickness in the case where the thickness of the root face is $t_1$ and the angle of inclination is $\alpha°$ as shown in FIG. 4 the relations of the following equations hold.

$$\tan \theta_2 = \frac{(T-t_1)\tan \theta_1}{(T-t_1)\cos \alpha}$$

$$\tan \theta_2 = \frac{\tan \theta_1}{\cos \alpha} \quad (1)$$

$$\theta_2 = \tan^{-1} \frac{\tan \theta_1}{\cos \alpha} \quad (2)$$

From the equation (1) there holds $$\theta_2 > \theta_1 \quad (3)$$

$$t_2 = t_1 \cdot \cos \alpha \quad (4)$$

From the equation (4) there holds $$t_2 < t_1 \quad (5)$$

As a result, with the prior art pipe end cutting apparatus, the angle of inclination between the cutting face of the processing tool and the normal of the pipe increases from 0° to $\alpha°$ when there occurs a transition from the condition for cutting the end of the pipe having the radius R to the condition for cutting the end of the pipe having the radius R+d, and thus a comparison between the cutting angle $\theta_1$ and the root face thickness $t_1$ obtained when the angle of inclination is 0° and the cutting angle $\theta_2$, and the root face thickness $t_2$ obtained when the angle of inclination is $\alpha°$, shows that the value of $\theta_2$ becomes greater than $\theta_1$ but the value of $t_2$ becomes smaller than $t_1$ as will be seen from the equations (3) and (5).

As described hereinabove, the prior art pipe end cutting apparatus is disadvantageous in that when the pipe diameter changes, the cutting angle and the root face thickness are changed and the cutting accuracy of the pipe end is deteriorated.

DISCLOSURE OF THE INVENTION

It is an object of the present invention to provide a pipe end cutting apparatus which eliminates the foregoing deficiencies of the prior art apparatus and ensures a high degree of cutting accuracy. For this purpose, the apparatus of this invention comprises a pipe clamping device for clamping a pipe from the inside thereof, a rotary driving unit supported on the pipe clamping device through a shaft, a feed unit for moving the rotary driving unit in the axial direction, and a control unit for controlling the rotary driving unit to rotate the same concentrically with the pipe, whereby a given number of processing tools are mounted on the rotary driving unit through parallelogram links in such a manner that each of the processing tools is moved in parallel in the radial direction of the pipe while allowing its cutting angle to maintain a predetermined angle with respect to the pipe end.

Namely, in accordance with the present invention, the processing tools are mounted on the rotary driving unit of the pipe end cutting apparatus through the parallelogram links such that each processing tool is adapted to make a parallel movement in the radial direction of the pipe while maintaining the cutting angle of the processing tool at a predetermined angle with respect to the pipe end. As a result, the angle of inclination of the processing tool with respect to the normal of the pipe, due to a change of the pipe diameter, is reduced as compared with that in the prior art apparatus, and the rates of change of the cutting angle and the root face thickness are reduced, thereby improving the cutting accuracy of the pipe end cutting apparatus as compared with the previous apparatus.

Figure 1:
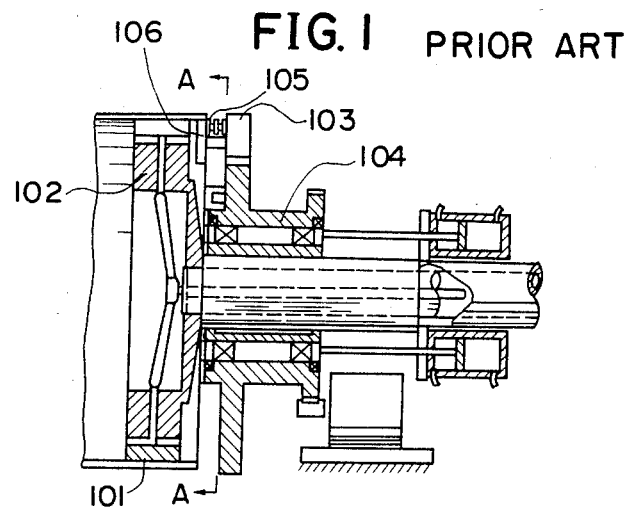
FIG. 1 is a partially cutaway front view of a prior art pipe end cutting apparatus.
Figure 2:
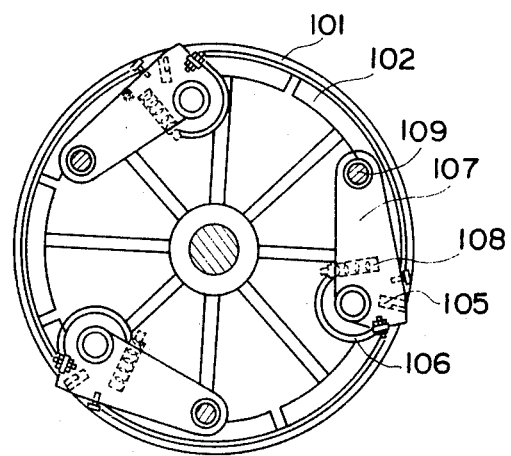
FIG. 2 is a side view viewed in the direction of the arrows along the line A—A of FIG. 1 with a part shown in section.

2 . . . pipe, 3 . . . pipe clamping device, 4 . . . non-rotating shaft, 5 . . . gear, 6 . . . face plate, 7 . . . rotary driving unit, 8 . . . spring, 9 . . . projecting rod, 12 . . . main arm rotary shaft, 13 . . . main arm, 14 . . . auxiliary arm rotary shaft, 15 . . . auxiliary arm, 16 . . . spring pin, 17 . . . processing tool holder pin, 18 . . . processing tool holder, 21 . . . processing tool, 24 . . . roller shaft, 25 . . . hydraulic motor, 27 . . . gear, 28 . . . feed unit, 30a, b . . . auxiliary hole.

BEST FORM FOR WORKING THE INVENTION

An embodiment of the invention will now be described with reference to the drawings. FIGS. 5, 6, 7 and 8 show the embodiment of the invention, in which a pipe clamping device (3) for holding a pipe (2) in place by means of clamp members (1) adapted to be operated by hydraulic oil, or the like, and pressed against the inner surface of the pipe (2), is positioned within the pipe in such a manner that a non-rotating shaft (4) connected to one side of the device (3) is positioned on the side of the pipe end, and a rotary driving unit (7), including a gear (5) adapted for rotation about the non-rotating shaft (4) and a face plate (6) adapted for rotation in a plane opposing the end of the pipe (2) is mounted on the non-rotating shaft.

Projecting rods 9 (see FIGS. 7 and 8) each for holding one end of a spring (8) are fixedly mounted on the face plate (6) to face the end side of the pipe (2).

Figure 8:
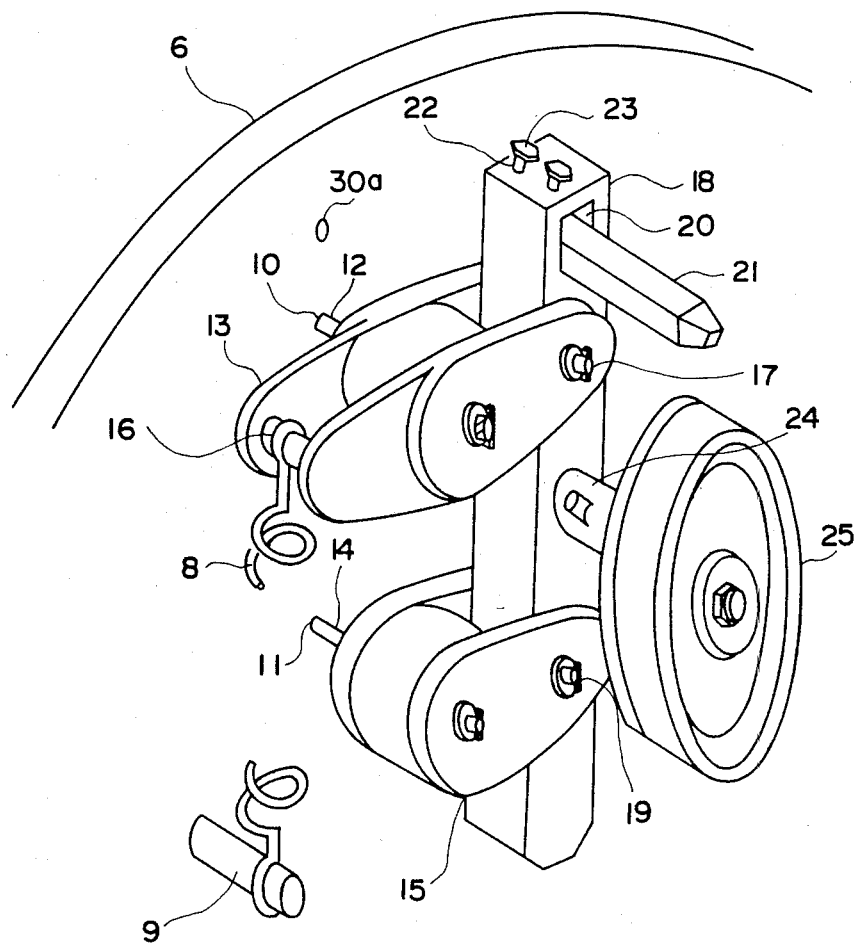
FIG. 8 is a perspective view of the portion C in FIG. 5.

Also, as shown in FIG. 8, holes (10) and (11) are formed in the face plate (6) and there are provided a main arm (13) through a main arm rotary shaft (12) fitted in each drilled hole (10) and an auxiliary arm (15) through an auxiliary arm rotary shaft (14) fitted in each hole (11) in such a manner that the main arm (13) and the auxiliary arm (15) form a parallel link.

While the rotary shaft (12) is positioned at the central portion of the main arm (13), a spring pin (16) for holding the other end of the spring (8) is fitted to one end of the main arm (13) and a processing tool holder (18) is connected to the other end of the main arm (13) through a processing tool holder pin (17).

While the auxiliary arm rotary shaft (14) is positioned at one end of the auxiliary arm (15), the processing tool holder (18) is connected to the other end of the auxiliary arm (15) through a processing tool holder pin (19).

The distance between the main arm rotary shaft (12) and the processing tool holder pin (17) is equal to the distance between the auxiliary arm rotary shaft (14) and the processing tool holder pin (19), and also the distance between the main arm rotary shaft (12) and the auxiliary arm rotary shaft (14) is equal to the distance between the processing tool holder pins (17) and (19). As a result, the face plate (6), the main arm (13), the auxiliary arm (15) and the processing tool holder (18) form a parallelogram link.

The spring (8) is extended between the spring pin (16) fitted to one end of the main arm (13) and the projecting rod (9) fixedly mounted in the face plate (6) so that the processing tool holder (18) is movable outwardly in the radial direction of the face plate (6) by virtue of the tension of the spring (8).

There is a drilled hole (20) at one end of each processing tool holder (18) and a processing tool (21) fitted in the drilled hole (20) is fastened to the processing tool holder (18) by screws (23) inserted into tapped holes (22). Also, a roller shaft (24) is fitted in the processing tool holder (18) substantially equally between the processing tool holder pins (17) and (19), and fixedly mounted on the forward end of the roller shaft (24) is a roller (25) for controlling the rotary driving unit (7) so as to rotate concentrically with the pipe (2).

Disposed in the vicinity of the gear (5) (see FIG. 5) is a hydraulic motor (26) for rotating the gear (5) and the face plate (6), and a gear (27) fixedly mounted on the forward end of the rotary shaft of the hydraulic motor (26) is in mesh with the gear (5).

Disposed in the vicinity of the rotary driving unit (7) is a feed unit (28) for moving the rotary driving unit (7) in the axial direction of the non-rotating shaft (4).

An arm (29) is fixedly mounted on the non-rotating shaft (4) so that the pipe (2) supported by the pipe clamping device (3) is held stably.

Then, the face plate (6) is formed with auxiliary holes (30a) and (30b) into which the main arm (13) is to be fitted. These auxiliary holes (30a) and (30b) are provided for the purpose of adjusting the position of the processing tool (21) in accordance with the pipe diameter.

Further, while the processing tool holder (18), etc., are provided at each of four places, the processing tool holders (18), etc., are not limited to the four places and any given number of them may be provided so as to make possible the adjustment of the processing tools in accordance with the shape into which the end of a pipe (2) is to be formed.

Next, the operation will be described.

When the gear (5) engaged with the gear (27) rotatable by the hydraulic motor (26) is rotated so that the rotary driving unit (7) is rotated, the face plate (6) is also rotated and thus the processing tools (21) fixedly mounted on the processing tool holders (18) are rotated. The rotating tools (21) engage with the end face of the pipe (2) and cut the end face of the pipe (2). During the cutting of the end face of the pipe (2), the rollers (25) are rotated along with the rotation of the face plate (6), and also the processing tool holders (18) are movable outwardly in the radial direction of the face plate (6) due to the tension of the springs (8), thereby causing the rollers (25) to rotate about the roller shafts (24) while contacting the inner surface of the pipe (2).

In order to adjust the position of the processing tools (21) in accordance with a change of the pipe diameter, it is only necessary to change the insertion of the main arm rotary shafts (12) from the holes (10) to the auxiliary holes (30a) and the auxiliary arm rotary shafts (14) from the holes (11) to the auxiliary holes (30b), or use processing tool holders (18) of a different length as substitutes.

Next, a description will be made of the angle of inclination of the processing tool cutting face with respect to the normal of the pipe which will be obtained upon transition from the condition for cutting the end of a pipe having a radius R to the condition for cutting the end of a pipe having a radius R+d.

Figure 3:
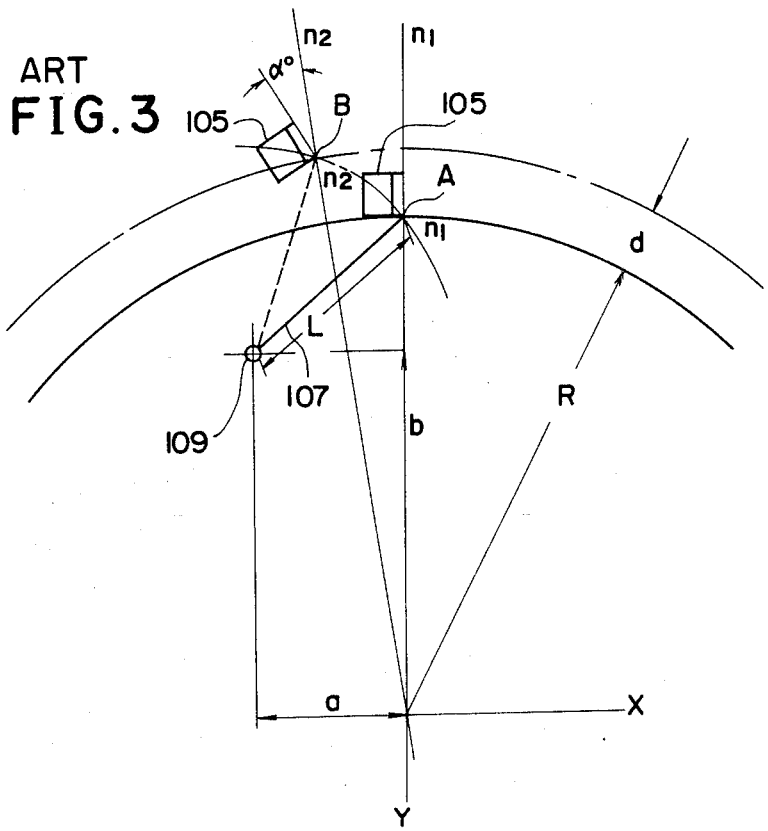
FIG. 3 is a fundamental diagram showing the angles of inclination of a processing tool in the prior art pipe end cutting apparatus.
Figure 4:
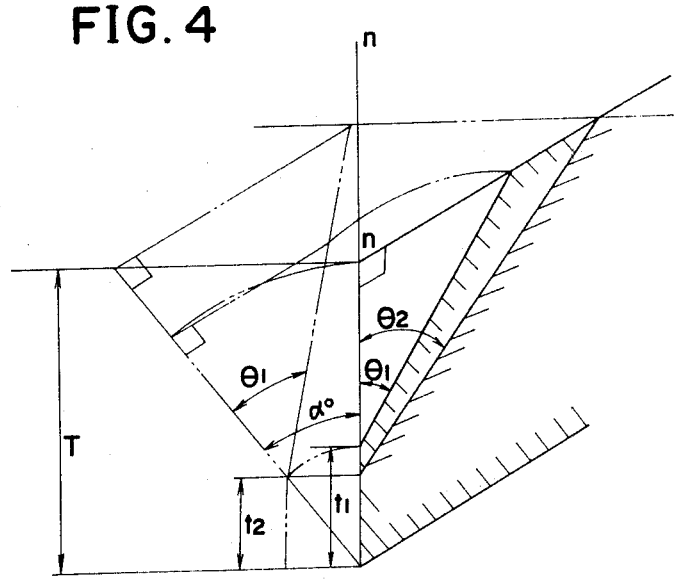
FIG. 4 is a fundamental view showing changes in the cutting angle and root face thickness caused by the inclinations of a processing tool in the case of a plate.
Figure 5:
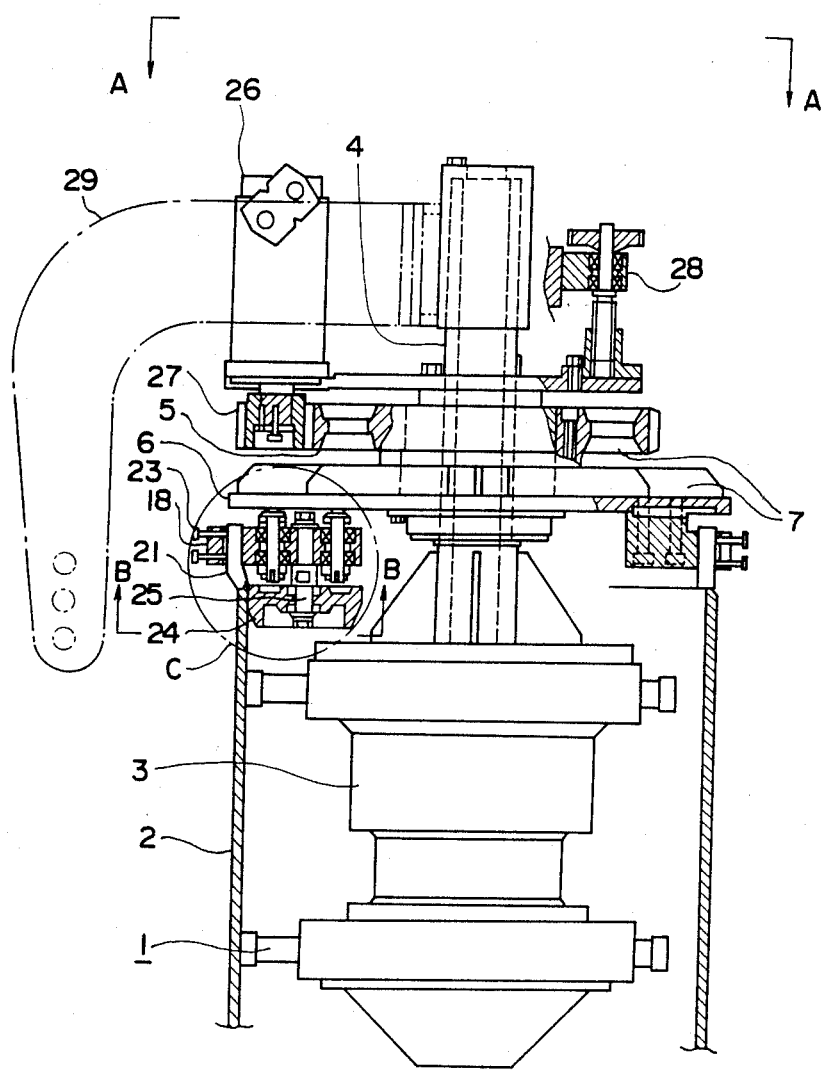
FIG. 5 is a partially cutaway front view of a pipe end cutting apparatus according to the present invention.
Figure 6:
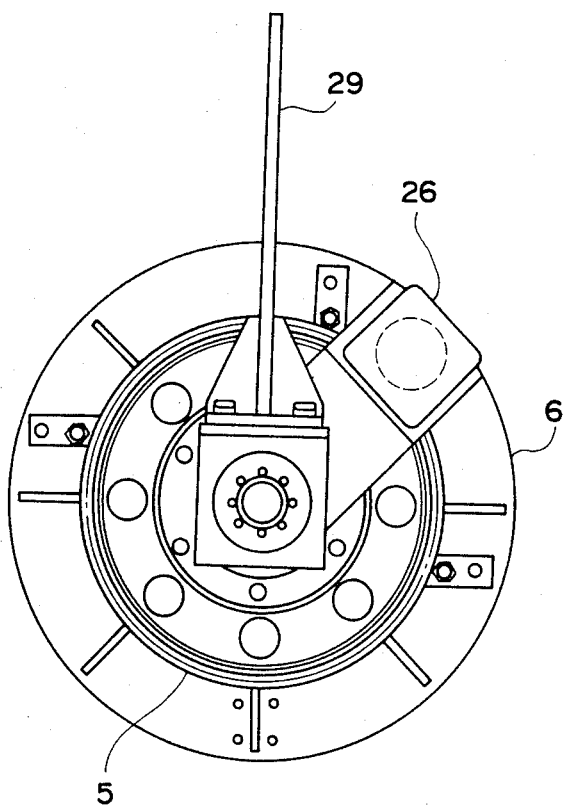
FIG. 6 is a side view viewed in the direction of the arrows along the line A—A of FIG. 5.
Figure 7:
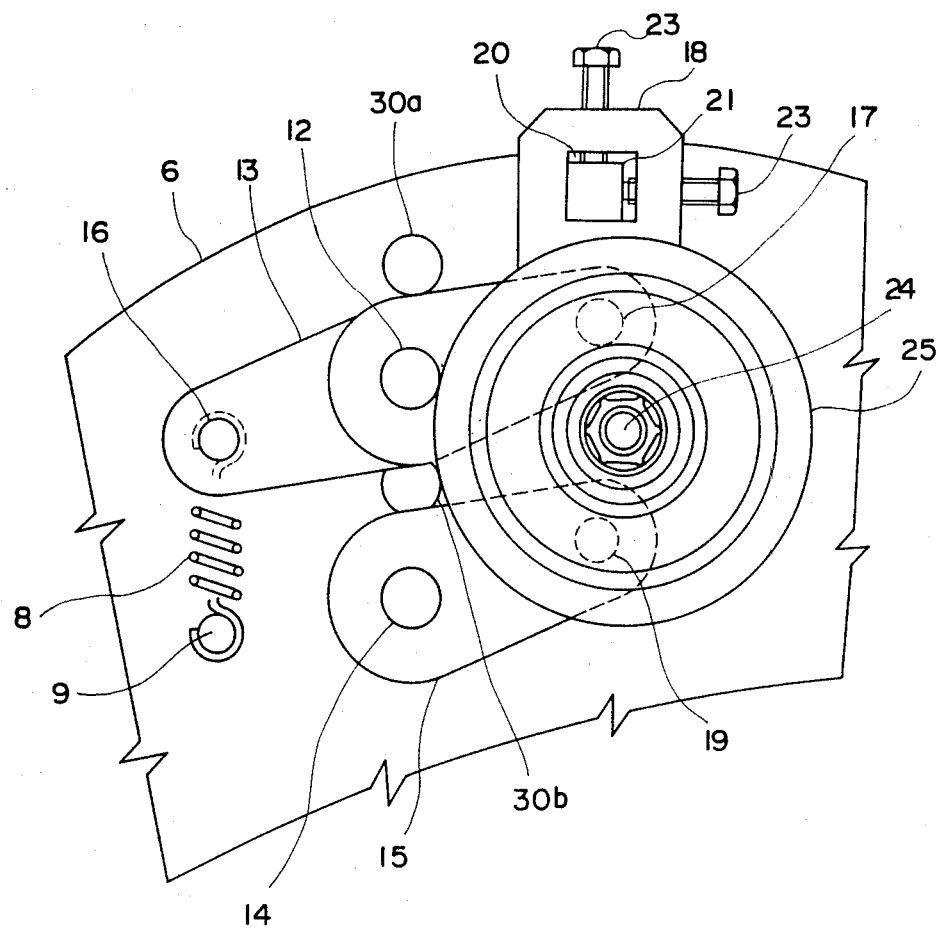
FIG. 7 is an enlarged side view of the portion C viewed in the direction of the arrows along the line B—B of FIG. 5.
Figure 9:
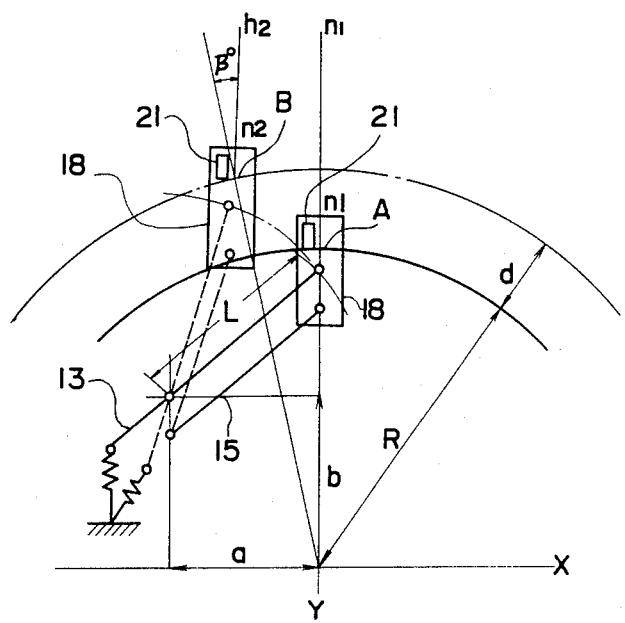
FIG. 9 is a fundamental diagram showing the angles of inclination of a processing tool according to the invention.
Figure 10:
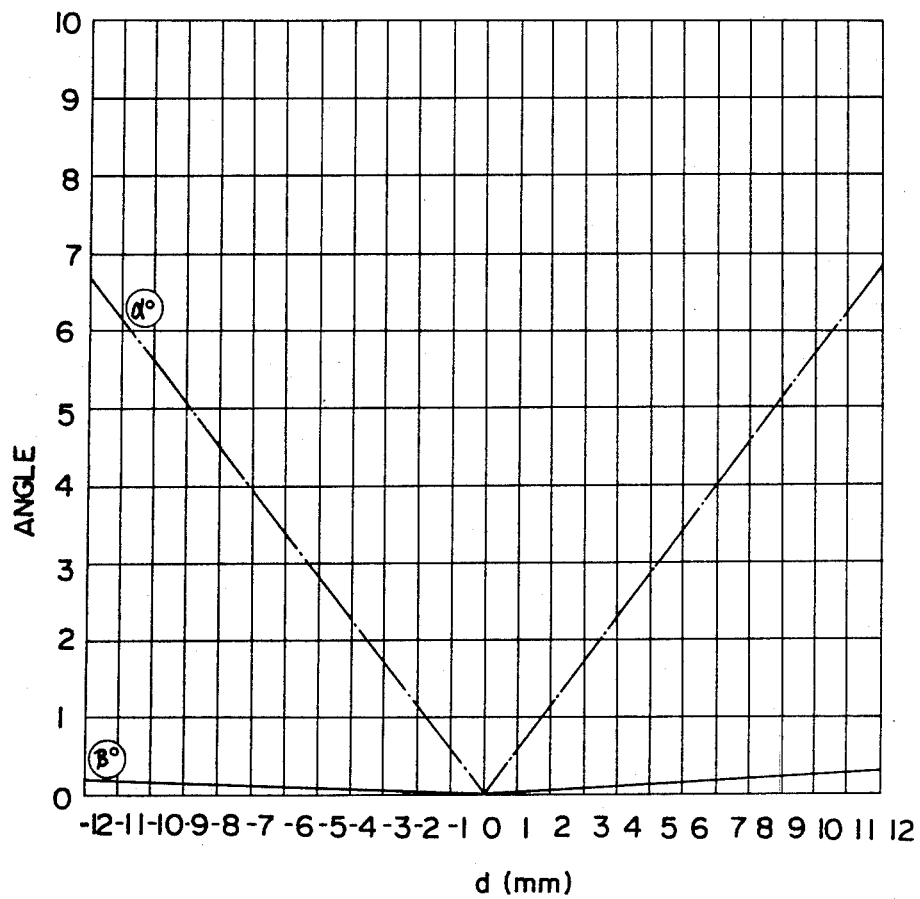
FIG. 10 is a graph showing a comparison between the angles of inclination of the processing tools in the prior art pipe end cutting apparatus and the angles of inclination of the processing tools according to the invention.

While, in the condition for cutting the end of the pipe having the radius R, the processing tool (21) is at a position A and the angle of inclination between the cutting face of the processing tool (21) and the normal $n_1-n_1$ of the pipe (2) is 0° as shown in FIG. 9, the processing tool (21) is positioned at a point B upon transition to the condition for cutting the end of the pipe having the radius R+d. When the processing tool (21) is moved to the point B, with the face plate (6), the main arm (13), the auxiliary arm (15) and the processing tool holder (18) forming the parallelogram link, the face plate (6) is held stationary and the main arm (13), the auxiliary arm (15) and the processing tool holder (18) are moved thereby making the cutting face of the processing tool (21) parallel to the normal $n_1-n_1$ of the pipe (2). Consequently, the cutting face of the processing tool (21) forms an angle of inclination of $\beta°$ with the normal $n_2-n_2$ of the pipe (2) obtained as the result of the positioning of the processing tool (21) at the point B.

Where a=100 mm, b=343.62 mm, L=103 mm and R=368 mm in FIGS. 3 and 9, the angles of inclination corresponding to the amounts of displacement d of the pipe radius become as shown in FIG. 10. Thus, it will be seen from FIG. 10 that in accordance with the invention the angles of inclination ($\beta°$) of the processing tools corresponding to the amounts of displacement d of the pipe radius assume considerably small values as compared with the conventional angles ($\alpha°$).

INDUSTRIAL UTILITY

The pipe end cutting apparatus according to the invention is useful as an apparatus by which the edge preparation prerequisite for satisfactorily welding pipes together is performed in accordance with the preset conditions, and it is particularly suitable as an apparatus for the edge preparation of pipes at a job site.

We claim:

1. A pipe end cutting apparatus comprising: a support arm adapted to be positioned adjacent to the end of a pipe; a support shaft carried by said support arm; setting means for setting a pipe to be beveled coaxially with respect to the support shaft; force transmitting means rotatably supported by said support shaft; machining means mounted on said force transmitting means and facing an end portion of the pipe to be beveled; driving means for moving the machining means about the pipe axis and adjacent the pipe end; wherein said machining means includes a main arm having spaced ends, a longitudinal axis positioned in a plane transverse to the axis of the pipe, and having a pivot point intermediate its ends, said main arm pivotally supported on said force transmitting means to be pivoted in a plane about said pivot point, an auxiliary arm spaced from and parallel to said main arm, said auxiliary arm having an end thereof supported at a predetermined distance from the pivot point of said main arm to be pivoted in the pivot plane of said main arm, a machining tool holder supported at one end of said main arm and at an end of said auxiliary arm allowing the main arm and the auxiliary arm to pivot with their longitudinal axes parallel to each other, a machining tool mounted on said machining tool holder and having a cutting edge carried on said machining tool holder and movable circumferentially along the inner surface of said pipe, guide means on said toolholder for maintaining the cutting edge of said machining tool at the pipe end, and means mounted on the other end of said main arm for urging said control means toward the inner surface of the pipe, whereby a parallelogram linkage is defined by said main arm, said auxiliary arm and said machining tool holder to minimize the change in the cutting angle between the machining tool and the pipe end for a range of pipe diameters.

2. A pipe end cutting apparatus as set forth in claim 1, wherein a plurality of auxiliary holes are formed in said force transmitting means for changing the pivoting positions of the parallelogram links relative to the force transmitting means, thereby making the radial movement of the machining tools adjustable.

3. A pipe end cutting apparatus as set forth in claim 1, wherein the parallelogram links are each adapted to receive a machining tool holder of a different length and thereby extend or reduce the position of the machining tool in the radial direction.

* * * * *